United States Patent
Albrecht et al.

(10) Patent No.: US 10,298,724 B2
(45) Date of Patent: May 21, 2019

(54) COMMUNICATION DEVICE AND METHOD FOR TRANSMITTING DATA WITHIN AN INDUSTRIAL AUTOMATION SYSTEM

(71) Applicant: Siemens Aktiengesellschaft, Munich (DE)

(72) Inventors: Harald Albrecht, Nuremberg (DE); Thomas Talanis, Heroldsbach (DE)

(73) Assignee: Siemens Aktiengesellschaft, Munich (DE)

( * ) Notice: Subject to any disclaimer, the term of this patent is extended or adjusted under 35 U.S.C. 154(b) by 431 days.

(21) Appl. No.: 15/055,225

(22) Filed: Feb. 26, 2016

(65) Prior Publication Data

US 2016/0255175 A1    Sep. 1, 2016

(30) Foreign Application Priority Data

Feb. 27, 2015   (EP) .................................... 15156972

(51) Int. Cl.
*H04L 29/06*       (2006.01)
*H04L 29/12*       (2006.01)
*H04L 29/08*       (2006.01)

(52) U.S. Cl.
CPC ........ *H04L 69/167* (2013.01); *H04L 61/1511* (2013.01); *H04L 61/251* (2013.01);
(Continued)

(58) Field of Classification Search
CPC .............. H04L 61/6068; H04L 69/167; H04L 61/6059; H04L 61/251; H04L 61/1511; H04L 67/12; H04L 61/6004
See application file for complete search history.

(56) References Cited

U.S. PATENT DOCUMENTS 7,333,510 B1    2/2008  Hies et al.
8,824,299 B1 *  9/2014  Caputo, II .............. H04L 45/22
                                                          370/235
(Continued)

FOREIGN PATENT DOCUMENTS

CN        1980254       6/2007
CN      101087296      12/2007
(Continued)

OTHER PUBLICATIONS

Singh et al., "IPv6 Subnet Model: The Relationship between Links and Subnet Prefixes", RFC5942, Internet Engineering Task Force, IETF, Jul. 2010.*

(Continued)

*Primary Examiner* — Oanh Duong
(74) *Attorney, Agent, or Firm* — Cozen O'Connor

(57) ABSTRACT

A communication device and method for transmit data within an industrial automation system which includes at least one subnetwork having a group of communication devices and a subnetwork control device, wherein a name or configuration service component assigned to the subnetwork control device acquires IPv4 addresses and associated device names for the group of communication devices, an IPv6 address is respectively calculated for the group of communication devices from an IPv6 prefix assigned to the subnetwork and the IPv4 addresses of the communication devices, address translation rules are determined from the IPv4 addresses of the communication devices and the calculated IPv6 addresses and are used for address translation between IPv4 addresses and IPv6 addresses by an address translation unit assigned to the subnetwork control device, and the calculated IPv6 addresses and the associated device names are stored in a superordinate name service server.

19 Claims, 3 Drawing Sheets

(52) U.S. Cl.
CPC ...... *H04L 61/6059* (2013.01); *H04L 61/6068* (2013.01); *H04L 67/12* (2013.01); *H04L 67/42* (2013.01); *H04L 61/6004* (2013.01)

(56) References Cited

U.S. PATENT DOCUMENTS

| | | | |
|---|---|---|---|
| 2004/0001509 A1 | 1/2004 | Zhang et al. | |
| 2007/0073850 A1* | 3/2007 | Callaghan | G05B 19/05 709/220 |
| 2010/0042714 A1* | 2/2010 | Choi | H04L 29/12301 709/223 |
| 2011/0004664 A1* | 1/2011 | Herberth | H04L 29/12594 709/206 |
| 2011/0038377 A1* | 2/2011 | Haddad | H04L 69/16 370/395.53 |
| 2012/0005299 A1 | 1/2012 | Xu | |
| 2013/0111065 A1* | 5/2013 | Donley | H04L 69/22 709/245 |
| 2013/0232278 A1* | 9/2013 | Zou | H04L 61/251 709/245 |
| 2013/0254426 A1 | 9/2013 | Vaswani et al. | |
| 2013/0343391 A1* | 12/2013 | Goode | H04L 45/306 370/392 |
| 2015/0066979 A1* | 3/2015 | Zhang | H04L 61/1511 707/769 |
| 2015/0085696 A1* | 3/2015 | Guo | H04W 48/16 370/254 |
| 2015/0358278 A1 | 12/2015 | Albrecht et al. | |
| 2016/0080313 A1* | 3/2016 | Hirschman | H04L 61/2007 370/329 |
| 2016/0291565 A1* | 10/2016 | Volevach | G05B 19/0428 |
| 2017/0171315 A1* | 6/2017 | McNab | H04L 67/12 |

FOREIGN PATENT DOCUMENTS

| | | | |
|---|---|---|---|
| CN | 103685032 | 3/2014 | |
| EP | 1 770 458 A2 | 4/2007 | |
| EP | 2 955 904 A1 | 12/2015 | |
| WO | WO 2009001183 A2 * | 12/2008 | ....... H04L 29/12801 |

OTHER PUBLICATIONS

Bagnulo M. et al.: "Stateful NAT64: Network Adre ss and Protocol Translation from IPv6 Clients to IPv4 Servers" rfc6146.txt; Alcatel-Lucent; Stateful NAT64: Network Address and Protocol Translation From IPV6 Clients to IPV4 Servers; RFC6146.txt; Internet; Engineering Task Force; IETF; Standard; Geneva; Switzerland; pp. 1-45; XP015075988; 2011.

Li, X.; Bao, C.; "IP/ICMP Translation Algorithm"; Intern et Engineering Task Force (IETF); Cernet Center/Tsinghua University F. Baker; Cisco Systems, Apr. 2011; ISSN: 2070-1721; 2011.

Bagnulo, M; UC3M; A. Sullivan, Shinkuro; P. Matthews;"DNS Extensions for Network Address Translation from IPv6 Clients to IPv4 Servers"; Alcatel-Lucent; I. van Beijnum; IMDEA Networks; Internet Enginnering Task Force (IETF); ISSN: 2070-1721; 2011.

* cited by examiner

COMMUNICATION DEVICE AND METHOD FOR TRANSMITTING DATA WITHIN AN INDUSTRIAL AUTOMATION SYSTEM

BACKGROUND OF THE INVENTION

1. Field of the Invention

The present invention relates to industrial automation systems and, more particularly, to a communication device and method for transmitting data within an industrial automation system.

2. Description of the Related Art

Industrial automation systems are used to monitor, control and regulate technical processes, in particular in the field of production, process and building automation, and make it possible to operate control devices, sensors, machines and industrial installations in a manner that is intended to be as autonomous as possible and independent of human interventions. On account of the continuously increasing importance of information technology for automation systems comprising numerous networked control or computer units, methods for reliably providing functions distributed over an automation system to provide monitoring, control and regulating functions are becoming increasingly important.

Interruptions in communication connections between computer units of an industrial automation system or automation devices may result in undesirable or unnecessary repetition of transmission of a service request. This causes additional utilization of communication connections of the industrial automation system, which may result in further system disruptions or faults. In addition, untransmitted messages or incompletely transmitted messages may prevent an industrial automation system from changing to or remaining in a safe operating state, for example. This may ultimately result in failure of a complete production installation and in a costly production standstill. A particular problem regularly results in industrial automation systems from message traffic with comparatively numerous but relatively short messages, thus intensifying the above problems.

EP 1 770 458 A2 describes an industrial automation system having at least one programmable logic control unit in which a configuration unit for configuring the control unit and for announcing its availability to a communication network is provided. Here, the configuration unit allocates a unique communication network address, which may be an IPv6 address, for example, to the control unit. The control unit can be automatically activated in this manner.

EP 14171757.9 discloses a method for allocating communication network addresses for network subscribers of a segmented network having a plurality of subnetworks. The subnetworks are each connected, via a subnetwork router, to a collection network that interconnects them. Here, the subnetwork routers determine a common address space in a decentralized manner by interchanging router messages distributed over the collection network, and communication network addresses for the network subscribers are stipulated inside the address space.

Internet Engineering Task Force (IETF), Request for Comments (RFC) 6145 and 6146, ISSN 2070-1721, April 2011, describes conversion of Transmission Control Protocol (TCP) and User Datagram Protocol (UDP) communication connections based on Internet Protocol, version 6 (IPv6) to communication connections based on Internet Protocol, version 4 (IPv4). In this case, such conversion is referred to as NAT64 (Network Address Translation). IPv6-based communication devices can access IPv4-based communication devices via NAT by performing address format adaptation, in particular. Within the scope of NAT64, IPv6 communication devices use virtual IPv6 addresses to access IPv4 communication devices, where the virtual IPv6 addresses are replaced with IPv4 addresses assigned to the IPv4 communication devices using an NAT64 server. Communication network addresses for return channels from IPv4 communication devices to IPv6 communication devices are translated in a similar manner.

In addition, IETF, RFC 6147, discloses the practice of calculating associated IPv6 address entries (AAAA Resource Records) from IPv4 address entries, which are referred to as A Resource Records (RR), in a Domain Name System (DNS) and of providing these associated IPv6 address entries via DNS servers. Derivation of AAAA Resource Records from A Records can fundamentally be performed manually by a DNS administrator, can be planned using an IP Address Management (IPAM) solution or can be continuously determined automatically using DNS64 servers.

SUMMARY OF THE INVENTION

It is an object of the present invention to provide an apparatus and method for transmitting data within an industrial automation system, which makes it possible for existing IPv4-based communication or automation devices to be used in a reliable and cost-effective manner by IPv6-based components of an industrial automation system.

This and other objects and advantages are achieved in accordance with the invention by providing a communication device and method for transmitting data inside an industrial automation system that comprises at least one subnetwork having a group of communication devices and a subnetwork control device, where a name or configuration service component assigned to the subnetwork control device acquires IPv4 addresses and associated device names for the group of communication devices. In particular, it may be the case that, for at least one part of the group of communication devices, data are transmitted at the switching level inside the subnetwork only using IPv4 addresses. The communication devices may each be integrated, for example, in an automation device or in an input/output unit of the industrial automation system. An IPv6 address is respectively calculated for the group of communication devices from an IPv6 prefix assigned to the subnetwork and the IPv4 addresses of the communication devices.

In accordance with the invention, a name service agent assigned to the subnetwork control device requests acquisition of the calculated IPv6 addresses and the associated device names for the group of communication devices in at least one superordinate name service server of the industrial automation system. The calculated IPv6 addresses and the associated device names are stored in the superordinate name service server in the event of a successful request. Address translation rules are determined for the group of communication devices from the IPv4 addresses of the communication devices and the calculated IPv6 addresses. The determined address translation rules are used for address translation between IPv4 addresses and IPv6 addresses by an address translation unit assigned to the subnetwork control device. Virtual IPv6 addresses can be reliably calculated for existing IPv4 communication devices via such adaptive address translation even in the event of changes such as changed prefixes or new devices. As a result, the continued operation of the devices can also be ensured in an IPv6 environment.

The subnetwork having the group of communication devices and the subnetwork control unit can be assigned, for example, to a cell of the industrial automation system. In addition, the industrial automation system may comprise a multiplicity of cells, where at least one individual IPv6 prefix is assigned to each cell. In this context, IPv4 addresses planned for existing cells can be adopted without any problems without this resulting in overlaps with device addresses from other cells. This is extremely important, in particular, in the case of series-manufactured machines or a multiplicity of substantially identical cells.

In accordance with one advantageous embodiment of the present invention, the subnetwork control device comprises a name service component of a zero-configuration name service. Here, the name service component of the subnetwork control device acquires IPv4 addresses and associated device names for the group of communication devices in accordance with a name resolution protocol. The IPv4 addresses and the associated device names for the group of communication devices are preferably acquired by the name service component of the subnetwork control device in accordance with a Discovery and Configuration Protocol or a multicast Domain Name System Protocol. As a result, it becomes possible to reliably implement the disclosed embodiments of the invention with relatively little effort.

In accordance with another advantageous embodiment of the method in accordance with the invention, the subnetwork control device comprises a configuration service component. This configuration service component of the subnetwork control device acquires device names in accordance with the Dynamic Host Control Protocol (DHCP), version 4, option 61 using a DHCP client identifier respectively specified in the communication device. This also makes it possible to use the method in accordance with disclosed embodiments of the invention in Ethernet/IP systems or based on the Common Industrial Protocol.

Preferably, an IPv6 address is respectively calculated from an IPv6 prefix assigned to the subnetwork and an IPv4 address only for communication devices each having a switching functional unit that is configured and set up only to process an IPv4 Internet protocol stack. An interface identifier can be respectively formed to calculate a respective IPv6 address, where the uppermost 32 bits of the identifier have an adjustable value and the lowermost 32 bits are formed from the respective IPv4 address. In addition, the subnetwork may have a separate associated IPv6 prefix that is used only for IPv6 addresses calculated from IPv4 addresses. As a result, it becomes possible to quickly and reliably identify the devices for which address translation is required.

In accordance with one particularly preferred embodiment of the present invention, the IPv6 prefix assigned to the subnetwork for calculating IPv6 addresses from IPv4 addresses is an off-link prefix. In contrast, on-link or link-local prefixes are usually used to identify devices that are reachable by other devices inside a local subnetwork without routers. Link-local prefixes are advantageously excluded when calculating IPv6 addresses from IPv4 addresses.

The superordinate name service server may be, in particular, a Domain Name System server that provides DNS clients of IPv6-based communication devices with a name service. The name service agent preferably comprises a client for dynamic DNS, by which storage of an assignment of IPv6 addresses calculated from IPv4 addresses and associated device names in the superordinate name service server is requested. This makes it possible to implement the disclosed embodiments of the present invention by resorting to fundamentally existing components.

In accordance with one particularly advantageous embodiment of the present invention, the address translation unit is integrated in a router which has a first switching functional unit for processing an IPv4 Internet protocol stack and a second switching functional unit for processing an IPv6 Internet protocol stack. Each switching functional unit can access a communication network adapter of a subnetwork control device via a communication network adapter driver. In addition, each communication network adapter may comprise a transmitting and receiving unit and a control unit for coordinating access to a communication medium. In addition, the subnetwork control device preferably comprises the name service agent and the router with the integrated address translation unit. Here, the subnetwork control device is connected to the group of communication devices inside its subnetwork via a first communication network adapter. The subnetwork control device is connected to the superordinate name service server via a second communication network adapter.

The communication device in accordance with the invention for an industrial automation system is configured to implement the method in accordance with the disclosed embodiments and comprises at least one first and one second transmitting and receiving unit. The communication device also has at least one first and one second control unit for coordinating access to a communication medium, a first switching functional unit for processing an IPv4 Internet protocol stack, and a second switching functional unit for processing an IPv6 Internet protocol stack. Provision is additionally made of a name or configuration service component that is configured and set up to acquire IPv4 addresses and associated device names for a group of communication devices inside a subnetwork.

The communication device in accordance with the invention also comprises a name service control unit which is configured to respectively calculate an IPv6 address for the group of communication devices from an IPv6 prefix assigned to the subnetwork and the IPv4 addresses of the communication devices. The name service control unit is also configured to determine address translation rules for the group of communication devices from the IPv4 addresses of the communication devices and the calculated IPv6 addresses. Provision is also made of a name service agent which is configured to request acquisition of the calculated IPv6 addresses and the associated device names for the group of communication devices in at least one superordinate name service server of the industrial automation system. The communication device additionally comprises an address translation unit which is configured to use the determined address translation rules for address translation between IPv4 addresses and IPv6 addresses.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention is described in more detail below using an exemplary embodiment with reference to the drawing, in which.

DETAILED DESCRIPTION OF THE EXEMPLARY EMBODIMENTS

Figure 1:
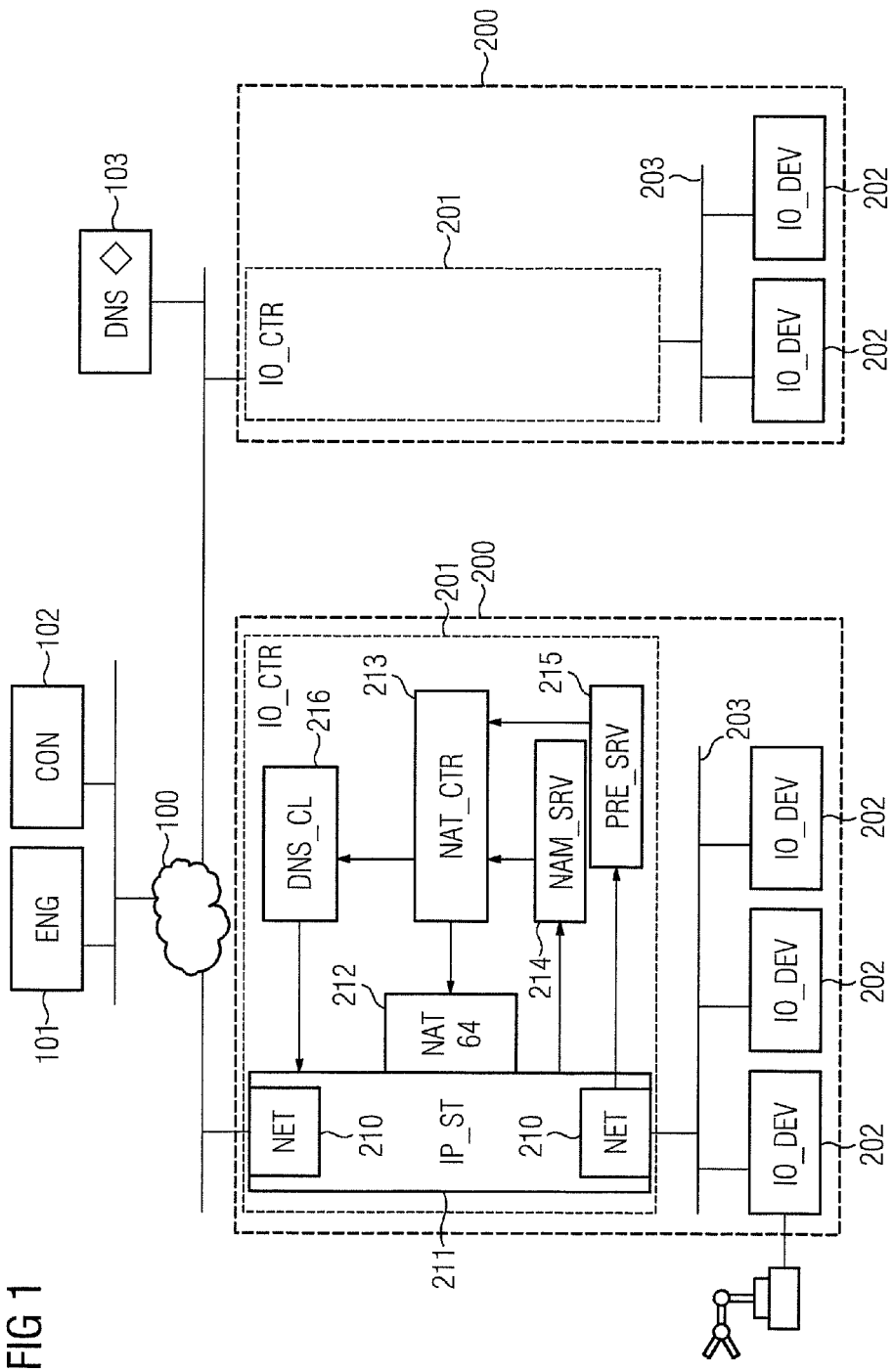
FIG. 1 shows an industrial automation system which comprises a plurality of substantially IPv4-based cells and has an engineering system, a control system and a DNS server.

The industrial automation system illustrated in FIG. 1 comprises an engineering system 101 for planning automation devices, a control system 102 for monitoring these devices, a Domain Name System (DNS) server 103 and a plurality of identical cells 200 each having a group of automation devices 202. The engineering system 101, the control system 102 and the DNS server 103 are connected to one another via an industrial communication network 100 within which data are transmitted in accordance with IPv6.

In the present exemplary embodiment, the automation devices 202 are input/output units that are each connected to a device to be controlled or monitored and comprise an integrated communication device that is based only on IPv4. In addition to the input/output units 202, the cells 200 each comprise a control device 202 that is connected to the input/output units 202 via a cell-specific subnetwork 203 and controls or monitors the input/output units 202. In addition, the control devices 201 connect the cells 200 to the IPv6-based industrial communication network 100 and, for this purpose, comprise an integrated router that includes a combined IP stack functional unit 211 for processing an IPv4 stack and an IPv6 stack. The control devices 201 also each have a first and a second communication network adapter 210, via which they are connected to the industrial communication network 100 and to the respective cell-specific subnetwork 203. Each communication network adapter 210 comprises a transmitting and receiving unit implemented via a PHY functional unit and a control unit implemented via a MAC functional unit for coordinating access to a communication medium. The IP stack functional units 211 of the control devices 201 each access the communication network adapters 210 via a communication network adapter driver.

In addition, the routers integrated in the control devices 201 each comprise an address translation unit 212 that is provided for address translation between IPv4 addresses and IPv6 addresses. The control devices 201 each additionally have a name or configuration service component 214 that acquires IPv4 addresses and associated device names of the input/output units 202 inside the respective subnetwork 203. An adaptive Network Address Translation (NAT64) controller 213 is respectively assigned to the address translation units 212 and respectively calculates a virtual IPv6 address from an IPv6 prefix individually assigned to the respective cell 200 and the IPv4 addresses of the input/output units 202. In order to provide the NAT64 controllers 213 with associated IPv6 prefixes, a prefix service component 215 is respectively provided and, for this purpose, accesses the communication network adapters 210. The respective NAT64 controller 213 determines address translation rules for the input/output units 202 inside its subnetwork 203 from the calculated virtual IPv6 addresses and the IPv4 addresses of the input/output units 202, where the address translation rules are used by the associated address translation unit 212.

The control devices 201 also each comprise a DDNS client 216 for dynamic DNS, where the DDNS client 216 requests acquisition of the calculated virtual IPv6 addresses and the associated device names for the input/output units 202 in its cell 200 in the DNS server 103. In the event of a successful request, the calculated IPv6 addresses and the associated device names are stored in the DNS server 103 and are made available by the DNA server 103 to DNS clients inside the IPv6-based industrial communication network 100, i.e., as a name service.

The name or configuration service component 214 may be in the form of a name service component of a zero-configuration name service and may acquire IPv4 addresses and associated device names of the respective input/output units 202 in accordance with a name resolution protocol. For example, the IPv4 addresses and the associated device names may be acquired in accordance with a Discovery and Configuration Protocol (DCP) or a multicast Domain Name System Protocol (mDNS). In accordance with an alternative embodiment, the name or configuration service component 214 may be in the form of a configuration service component and may acquire device names of the respective input/output units 202 in accordance with a Dynamic Host Control Protocol (DHCP), version 4, option 61 via a DHCP client identifier respectively specified in the communication device. Here, if a DHCP configuration service component allocates IPv4 addresses for the input/output units 202, then corresponding address information is already available there and does not need to be separately requested.

Preferably, an interface identifier is respectively formed to calculate a respective virtual IPv6 address, where the uppermost 32 bits of which identifier have an adjustable value and the lowermost 32 bits are formed from the respective IPv4 address. This avoids a collision with IPv6 addresses formed from MAC addresses via Stateless Address Autoconfiguration (SLAAC) if IPv6-based automation or communication devices are additionally operated in the cells. The described calculation of virtual IPv6 addresses therefore enables parallel operation of IPv4-based devices, for which described address translation is performed, with IPv6-based automation or communication devices. This is also true, in particular, when using a common prefix for IPv4-based and IPv6-based devices.

In addition, address translation does not have to be individually activated for each IPv4-based device, but rather can be initiated instead for all IPv4-based devices inside a cell or a subnetwork. As a consequence, it becomes possible to significantly reduce the number of address translation rules to be used by the respective address translation unit 212. A special IPv6 prefix is advantageously assigned to each cell 200, where the prefix is used only for virtual IPv6 addresses calculated from IPv4 addresses and is an off-link prefix. In contrast, link-local and on-link prefixes are excluded when calculating virtual IPv6 addresses from IPv4 addresses.

The adaptive NAT64 controller 213, in particular, ensures that virtual IPv6 addresses that are distinguishable from one another are assigned to all input/output units 202 having an identical IPv4 address even in the case of cells 200 identically installed in series. This is because different IPv6 prefixes are assigned to the cells 200 for this purpose. These IPv6 prefixes may be allocated in an automated manner to the cells 200 representing subnetworks, in particular by Prefix Delegation (PD) according to IETF, RFC 6147.

Figure 2:
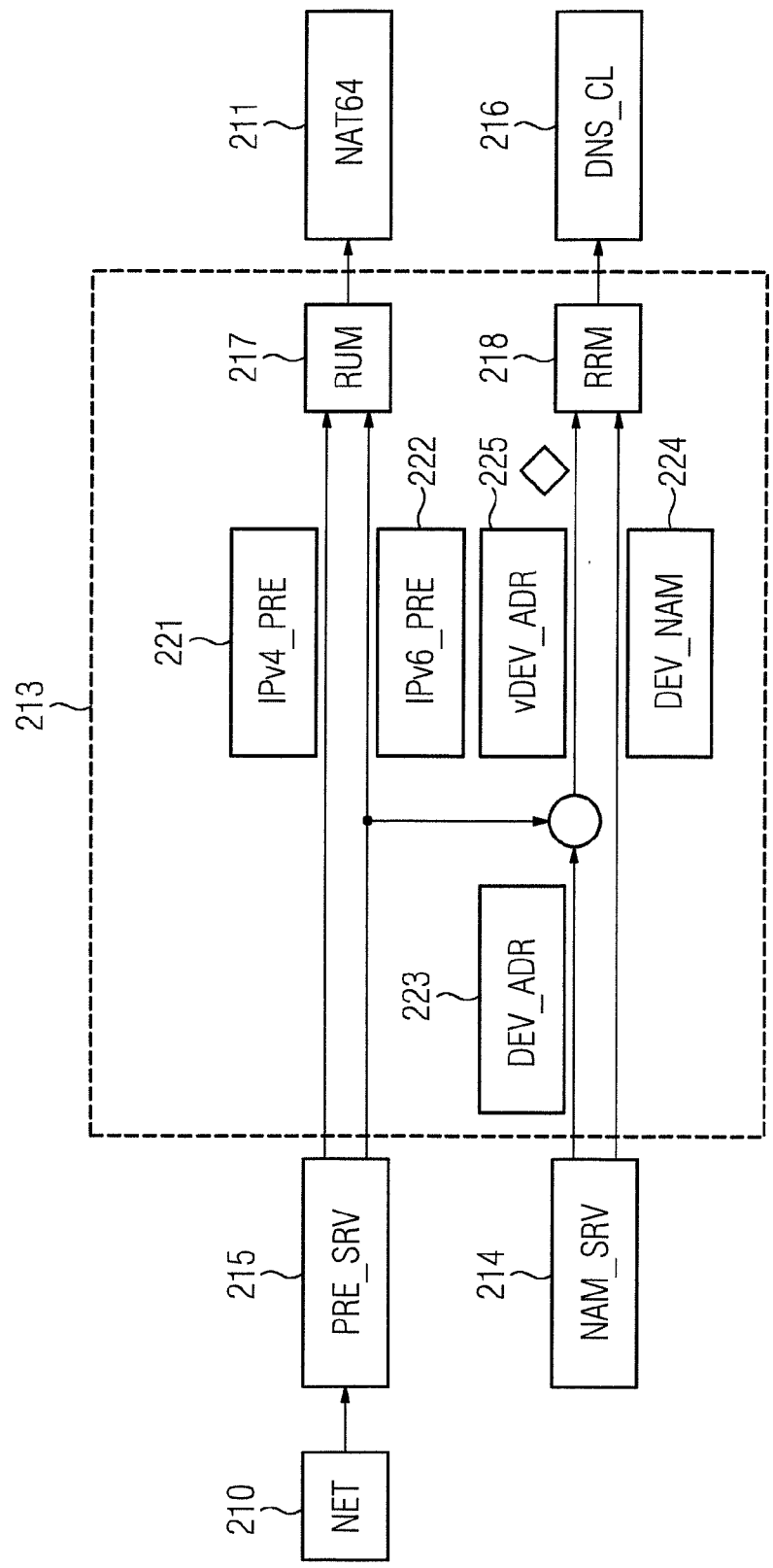
FIG. 2 shows a detailed illustration of a controller for an address translation unit.

The adaptive NAT64 controller 213 re-calculates addresses as soon as device names change, for instance as a result of expiry or addition, or as soon as prefixes change. As illustrated in FIG. 2, the prefix service component 215 respectively provides the adaptive NAT64 controller 213 with current IPv4 prefix information 221 and IPv6 prefix information 222 for this purpose. In addition, the name or configuration service component 214 transmits IPv4 address information 223 and device name information 224 to the adaptive NAT64 controller 213. The adaptive NAT64 controller 213 accordingly controls the associated address translation unit 211 using its rule manager 217. The rule manager 217 respectively generates required rules for the address translation and also deletes out-of-date rules.

The adaptive NAT64 controller controls the respective DDNS client 216 with the aid of its resource record manager 218. The resource record manager 218 checks that AAAA resource records for calculated virtual IPv6 addresses 225 are registered, updated or deleted in the DNS server 103. In addition, the resource record manager also handles possible errors when registering or deregistering resource records in DNS servers.

IPv6-based devices can request the virtual IPv6 addresses 225 of the input/output units 202 on the basis of device names recorded in the DNS server 103 in order to uniquely access said input/output units. The virtual IPv6 addresses 225 are translated to IPv4 addresses in a manner invisible to users and applications in the control devices 201 by NAT64 for continuous communication.

Figure 3:
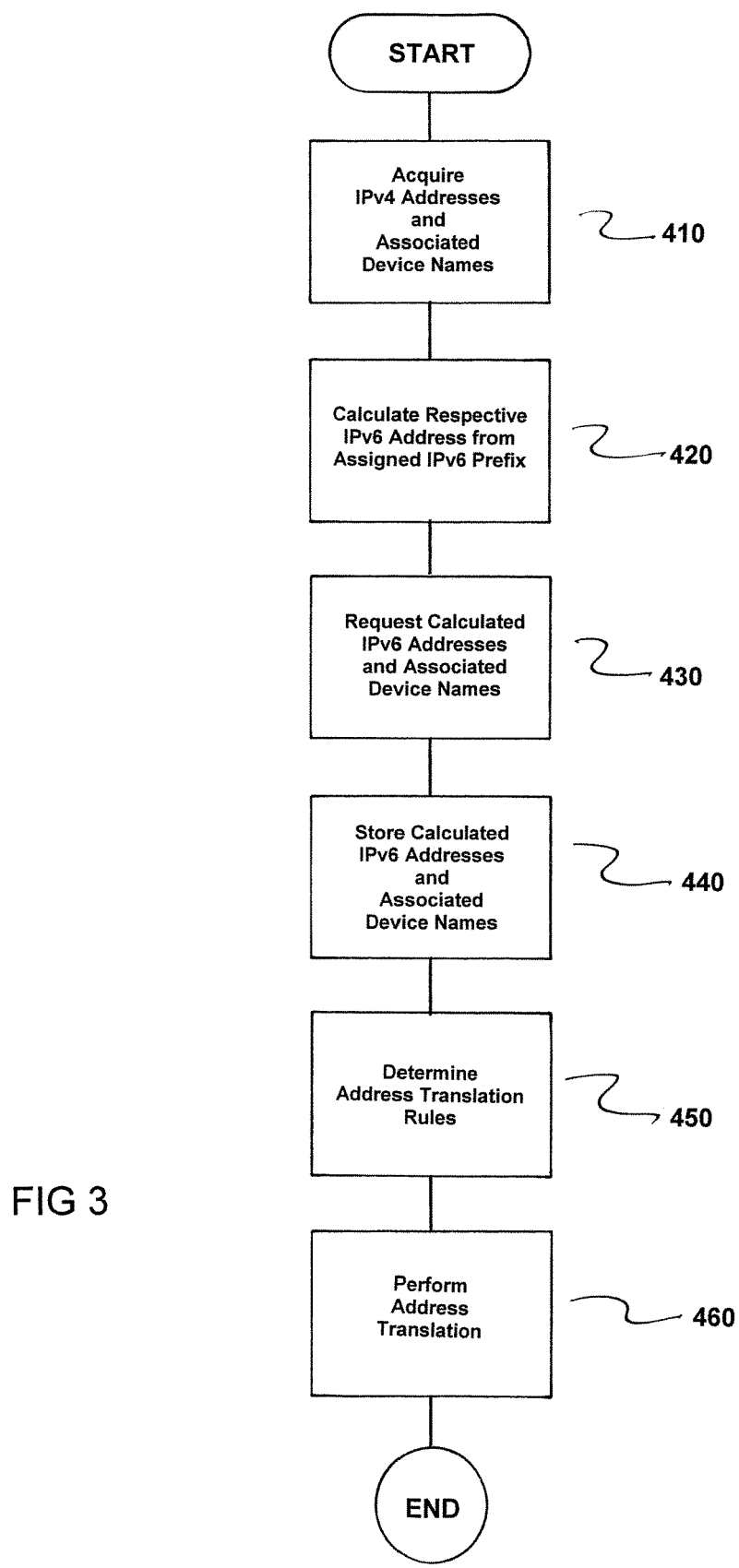
FIG. 3 is a flowchart of the method in accordance with the invention.

FIG. 3 is a flowchart of a method for transmitting data inside an industrial automation system, where the industrial automation system comprises at least one subnetwork having a group of communication devices and a subnetwork control device.

The method comprises acquiring, by a name or configuration service component assigned to the subnetwork control device, IPv4 addresses and associated device names for the group of communication devices, as indicated in step 410.

Next, a respective IPv6 address for the group of communication devices are calculated from an IPv6 prefix assigned to the at least one subnetwork and the IPv4 addresses of the communication devices, as indicated in step 420.

A name service agent, assigned to the subnetwork control device, now requests acquisition of the calculated IPv6 addresses and the associated device names for the group of communication devices in at least one superordinate name service server of the industrial automation system, as indicated in step 430.

Next, the calculated IPv6 addresses and the associated device names are stored in the at least one superordinate name service server in an event of a successful request, as indicated in step 440.

Next, address translation rules for the group of communication devices are determined from the IPv4 addresses of the communication devices and the calculated IPv6 addresses, as indicated in step 450.

Address translation between IPv4 addresses and IPv6 addresses are now performed by an address translation unit assigned to the subnetwork control device based on the determined address translation rules, as indicated in step 460.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for transmitting data inside an industrial automation system, wherein the industrial automation system comprises an engineering system, a control system, at least one superordinate name service server and at least one subnetwork having a group of communication devices and a subnetwork control device, the method comprising:
   acquiring, by a name or configuration service component assigned to the subnetwork control device, IPv4 addresses and associated device names for the group of communication devices;
   calculating a respective IPv6 address for the group of communication devices from an IPv6 prefix assigned to the at least one subnetwork and the IPv4 addresses of the communication devices;
   requesting, by a name service agent assigned to the subnetwork control device, acquisition of the calculated IPv6 addresses and the associated device names for the group of communication devices in at least one superordinate name service server of the industrial automation system, said at least one superordinate name service server being connected to the engineering system and the control system via an industrial communication network;
   storing the calculated IPv6 addresses and the associated device names in the at least one superordinate name service server in an event of a successful request;
   determining address translation rules for the group of communication devices from the IPv4 addresses of the communication devices and the calculated IPv6 addresses;
   performing, by an address translation unit assigned to the subnetwork control device, address translation between IPv4 addresses and IPv6 addresses based on the determined address translation rules.

2. The method as claimed in claim 1, wherein the subnetwork control device comprises a name service component of a zero-configuration name service;
   wherein the name service component of the subnetwork control device acquires IPv4 addresses and associated device names for the group of communication devices in accordance with a name resolution protocol; and
   wherein the IPv4 addresses and the associated device names for the group of communication devices are acquired by the name service component of the subnetwork control device in accordance with a Discovery and Configuration Protocol or a multicast Domain Name System Protocol.

3. The method as claimed in claim 1, wherein the subnetwork control device comprises a configuration service component; and
   wherein the configuration service component of the subnetwork control device acquires device names in accordance with Dynamic Host Control Protocol, version 4, option 61 using a DHCP client identifier respectively specified in a communication device.

4. The method as claimed in claim 1, wherein data are transmitted at the switching level inside the subnetwork only using IPv4 addresses for at least one part of the group of communication devices.

5. The method as claimed in claim 1, wherein an IPv6 address is respectively calculated from an IPv6 prefix assigned to the subnetwork and an IPv4 address only for communication devices each having a switching functional unit which is configured only to process an IPv4 Internet protocol stack.

6. The method as claimed in claim 5, further comprising:
forming a respective interface identifier to calculate a respective IPv6 address, an uppermost 32 bits of said formed interface identifier having an adjustable value and a lowermost 32 bits which are formed from the respective IPv4 address.

7. The method as claimed in claim 6, wherein the at least one subnetwork has a separate associated IPv6 prefix which is used only for IPv6 addresses calculated from IPv4 addresses.

8. The method as claimed in claim 5, wherein the at least one subnetwork has a separate associated IPv6 prefix which is used only for IPv6 addresses calculated from IPv4 addresses.

9. The method as claimed in claim 1, wherein the IPv6 prefix assigned to the at least one subnetwork for calculating IPv6 addresses from IPv4 addresses is an off-link prefix.

10. The method as claimed in claim 9, wherein link-local prefixes are excluded when calculating IPv6 addresses from IPv4 addresses.

11. The method as claimed in claim 1, wherein the at least one subnetwork having the group of communication devices and the subnetwork control unit is assigned to a cell of the industrial automation system.

12. The method as claimed in claim 11, wherein the industrial automation system comprises a plurality of cells; and wherein at least one individual IPv6 prefix is assigned to each cell of the plurality of cells.

13. The method as claimed in claim 1, wherein the superordinate name service server is a Domain Name System server which provides DNS clients of IPv6-based communication devices with a name service.

14. The method as claimed in claim 1, wherein the name service agent comprises a client for dynamic DNS, by which storage of an assignment of IPv6 addresses calculated from IPv4 addresses and associated device names in the superordinate name service server is requested.

15. The method as claimed in claim 1, wherein the address translation unit is integrated in a router which has a first switching functional unit for processing an IPv4 Internet protocol stack and a second switching functional unit for processing an IPv6 Internet protocol stack.

16. The method as claimed in claim 15, wherein each switching functional unit accesses a communication network adapter of a subnetwork control device via a communication network adapter driver; and wherein each communication network adapter comprises a transmitting and receiving unit and a control unit for coordinating access to a communication medium.

17. The method as claimed in claim 16, wherein the subnetwork control device comprises the name service agent and the router with the integrated address translation unit; and
wherein the subnetwork control device is connected to the group of communication devices inside its subnetwork via a first communication network adapter; and
wherein the subnetwork control device is connected to the superordinate name service server via a second communication network adapter.

18. The method as claimed in claim 1, wherein the group of communication devices are each integrated in one of (i) an automation device and (ii) an input/output unit of the industrial automation system.

19. A communication device for an industrial automation system, comprising:
at least one first and one second transmitter/receiver;
at least one first and one second controller which coordinate access to a communication medium;
a first switcher which processes an IPv4 Internet protocol stack;
a second switcher which processes an IPv6 Internet protocol stack;
a name or configuration service which acquires IPv4 addresses and associated device names for a group of communication devices inside a subnetwork;
a name service controller which respectively calculates an IPv6 address for the group of communication devices from an IPv6 prefix assigned to the subnetwork and the IPv4 addresses of the communication devices, the name service further determining address translation rules for the group of communication devices from the IPv4 addresses of the communication devices and the calculated IPv6 addresses;
a name service agent which requests acquisition of the calculated IPv6 addresses and the associated device names for the group of communication devices in at least one superordinate name service server connected to an engineering system and a control system of the industrial automation system via an industrial communication network; and
an address translator which utilizes the determined address translation rules for address translation between IPv4 addresses and IPv6 addresses.

* * * * *